United States Patent
Montojo et al.

(10) Patent No.: US 9,131,464 B2
(45) Date of Patent: *Sep. 8, 2015

(54) CONTROL ARRANGEMENT AND METHOD FOR COMMUNICATING PAGING MESSAGES IN A WIRELESS COMMUNICATION SYSTEM

(71) Applicant: QUALCOMM Incorporated, San Diego, CA (US)

(72) Inventors: Juan Montojo, San Diego, CA (US); Byoung-Hoon Kim, Seoul (KR); Durga Prasad Malladi, San Diego, CA (US); Sandip Sarkar, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,675

(22) Filed: Nov. 20, 2013

(65) Prior Publication Data

US 2014/0079036 A1 Mar. 20, 2014

Related U.S. Application Data

(63) Continuation of application No. 12/259,809, filed on Oct. 28, 2008, now Pat. No. 8,600,413.

(60) Provisional application No. 60/983,631, filed on Oct. 30, 2007.

(51) Int. Cl.
*H04W 68/02* (2009.01)

(52) U.S. Cl.
CPC ............ *H04W 68/02* (2013.01); *H04W 68/025* (2013.01)

(58) Field of Classification Search
CPC ...... H04W 68/00; H04W 68/02; H04W 68/06
USPC .................. 455/458, 450, 515; 370/336, 431
See application file for complete search history.

(56) References Cited

U.S. PATENT DOCUMENTS 5,937,019 A 8/1999 Padovani
6,021,311 A 2/2000 Gibson et al.
(Continued)

FOREIGN PATENT DOCUMENTS

CN 1949920 A 4/2007
JP 2006033820 A 2/2006
(Continued)

OTHER PUBLICATIONS

International Search Report & Written Opinion—PCT/US2008/081642, International Search Authority—European Patent Office—Jul. 6, 2009.

(Continued)

*Primary Examiner* — Kashif Siddiqui
*Assistant Examiner* — Farideh Madani
(74) *Attorney, Agent, or Firm* — Paul Kuo (57) ABSTRACT

Systems and methods for utilizing paging group IDs and paging indicators are disclosed for PDCCH and PDSCH transmissions to mobile terminals in a mobile communication system. By use of the paging group IDs and paging indicators, various groups of mobile terminals, including subsets of those groups can be paged with reduced decoding requirements. Nesting of the grouping is exploited and packing of the PDCCH frame to accomplish efficient use is described.

14 Claims, 8 Drawing Sheets

(56) References Cited

U.S. PATENT DOCUMENTS

| | | | |
|---|---|---|---|
| 6,717,978 B1* | 4/2004 | Yang et al. | 375/150 |
| 7,221,939 B2 | 5/2007 | Ylitalo et al. | |
| 7,286,563 B2 | 10/2007 | Chang et al. | |
| 7,447,515 B2 | 11/2008 | Han et al. | |
| 7,515,559 B2 | 4/2009 | Koo et al. | |
| 8,144,735 B2 | 3/2012 | Vayanos et al. | |
| 8,600,413 B2* | 12/2013 | Montojo et al. | 455/458 |
| 2003/0016698 A1 | 1/2003 | Chang et al. | |
| 2003/0035403 A1 | 2/2003 | Choi et al. | |
| 2004/0023672 A1* | 2/2004 | Terry | 455/458 |
| 2004/0174845 A1 | 9/2004 | Koo et al. | |
| 2005/0117553 A1 | 6/2005 | Wang et al. | |
| 2008/0123585 A1 | 5/2008 | Granzow et al. | |
| 2008/0159323 A1* | 7/2008 | Rinne et al. | 370/431 |
| 2009/0143072 A1 | 6/2009 | Montojo et al. | |

FOREIGN PATENT DOCUMENTS

| | | |
|---|---|---|
| JP | 2007522776 A | 3/2011 |
| JP | 4685958 B2 | 5/2011 |
| RU | 2197792 C2 | 1/2003 |
| RU | 2242092 C2 | 12/2004 |
| RU | 2292669 | 1/2007 |
| WO | WO-98006230 | 2/1998 |
| WO | 2005067182 A1 | 7/2005 |
| WO | 2005117299 A1 | 12/2005 |
| WO | 2007052917 A1 | 5/2007 |
| WO | 2009035060 A1 | 3/2009 |

OTHER PUBLICATIONS

Ipwireless, et al., "Paging group indication" 3GPP Draft; R2-074187, 3rd Generation Partnership Project (3GPP), Mobile Competence Centre; 650, Route des Lucioles; F-06921 Sophia-Antipolis Cedex; France, vol. tsg_ranWG2_RL2TSGR2_59bisDocs, no. Shanghai, China; 20071008, Oct. 1, 2007, XP050136809.

Philips et al: "PDSCH timing for Power Saving with Paging" 3GPP Draft; R2-074362, 3rd Generation Partnership Project (3GPP), Mobile Competence Centre; 650, Route des Lucioles F-06921 Sophia-Antipolis Cedex; France, vol. tsg_ranWG2_RL2TSGR2_59bisDocs, no. Shanghai, China; 20071008, Oct. 2, 2007, XP050136934.

Qualcomm Europe: "Paging mechanism" 3GPP Draft; R2-073995, 3rd Generation Partnership Project (3GPP), Mobile Competence Centre; 650, Route des Lucioles F-06921 Sophia-Antipolis Cedex; France, vol . tsg_ranWG2_RL2TS6R2_59bisDocs, no. Shanghai, China; 20071008, Oct. 1, 2007, XP050136636.

Qualcomm Europe: "PDCCH format for Paging" 3GPP Draft; R1-081480, 3rd Generation Partnership Project (3GPP), Mobile Competence Centre; 650, Route des Lucioles ; F-06921 Sophia-Antipolis Cedex France, vol. tsg_ranWG1_RL1TSGR1_52bDocs, no. Shenzhen, China; 20080331, Mar. 26, 2008, XP050109897.

Taiwan Search Report—TW097141869—TIPO—Mar. 26, 2012.

* cited by examiner

PDCCH-3

| RESOURCE ALLOCATION | PI1 | PI2 | ... | PIn | Paging ID |

CONTROL ARRANGEMENT AND METHOD FOR COMMUNICATING PAGING MESSAGES IN A WIRELESS COMMUNICATION SYSTEM

RELATED APPLICATIONS

The present Patent Application is a continuation of U.S. patent application Ser. No. 12/259,809, entitled "Control Arrangement and Method for Communicating Paging Messages in a Wireless Communication System," and filed Oct. 28, 2008; which claims priority to U.S. Provisional Patent Application No. 60/983,631, entitled "Control Arrangement and Method for Communicating Paging Messages in a Wireless Communication System," and filed Oct. 30, 2007, each of which is assigned to the assignee hereof and filed by the inventors hereof and which is incorporated by reference herein.

FIELD

This disclosure relates generally to wireless communications, and more particularly to control of paging to wireless terminals.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

In current mobile systems, particularly in the newer generation systems, there has been the need to efficiently and easily control paging information sent to user terminals. Given the complexity of these newer systems, the following description provides methods and systems for addressing these and other needs in the mobile community.

SUMMARY

The present disclosure is directed to systems and methods for managing paging parameters sent to terminals, and variations thereof.

In one of various aspects of the disclosure, a method for transmitting paging messages in a wireless communication system is provided, the method comprising: time-hashing at least one user equipment (UE) to a particular subframe, the particular subframe defining a paging occasion for a paging group associated with the at least one UE; associating a paging group ID for the paging group with a physical downlink control channel (PDCCH); allocating, in the PDCCH, resources associated with a physical downlink shared channel (PDSCH); and transmitting, in the PDSCH, a paging message for the at least one UE during the paging occasion.

In another aspect of the disclosure, the method above is provided, wherein associating the paging group ID with the PDCCH, further comprises CRC masking the PDCCH with the paging group ID.

In another aspect of the disclosure, a modification of the first method is provided, further comprising transmitting on the PDCCH a paging indicator (PI) associated with the paging group associated with the at least one UE.

In another aspect of the disclosure, the PI is identified by the time hashing and the CRC masking.

In another aspect of the disclosure, a method according to the above is provided, further comprising transmitting on a separate PDCCH the paging indicator (PI) associated with the paging group associated with the at least one UE.

In another aspect of the disclosure, a method according to the above is provided, wherein the PDCCH is the same as a conventional PDCCH with an exception of a terminating ID being replaced with a specialized paging group ID.

In another aspect of the disclosure, an apparatus operable in wireless communication system is provided, the apparatus comprising: means for time-hashing at least one user equipment (UE) to a particular subframe, the particular subframe defining a paging occasion for a paging group associated with the at least one UE; means for associating a paging group ID for the paging group with a physical downlink control channel (PDCCH); means for allocating, in the PDCCH, resources associated with a physical downlink shared channel (PDSCH); and means for transmitting, in the PDSCH, a paging message for the at least one UE during the paging occasion.

The apparatus of claim 7, further comprising means for transmitting on the PDCCH a paging indicator (PI) associated with the paging group associated with the at least one UE.

In another aspect of the disclosure, an apparatus according to the above is provide, further comprising means for transmitting on a separate PDCCH the paging indicator (PI) associated with the paging group associated with the at least one UE.

In another aspect of the disclosure, an apparatus of according to the above is provided, wherein the PDCCH is the same as a conventional PDCCH with an exception of a terminating ID being replaced with a specialized paging group ID.

In another aspect of the disclosure, a machine-readable medium comprising instructions is provided, which, when executed by a machine, cause the machine to perform operations including: time-hashing at least one user equipment (UE) to a particular subframe, the particular subframe defining a paging occasion for a paging group associated with the at least one UE; associating a paging group ID for the paging group with a physical downlink control channel (PDCCH); allocating, in the PDCCH, resources associated with a physical downlink shared channel (PDSCH); and transmitting, in the PDSCH, a paging message for the at least one UE during the paging occasion.

In another aspect of the disclosure, a machine-readable medium according to the above is provided, further comprising instructions for transmitting on the PDCCH a paging indicator (PI) associated with the paging group associated with the at least one UE.

In another aspect of the disclosure, the machine-readable medium according to the above is provided, further comprising instructions for transmitting on a separate PDCCH the paging indicator (PI) associated with the paging group associated with the at least one UE.

In another aspect of the disclosure, the machine-readable medium above is provided, wherein the PDCCH is the same as a conventional PDCCH with an exception of a terminating ID being replaced with a specialized paging group ID.

In another aspect of the disclosure, an apparatus operable in a wireless communication system is provided, the apparatus comprising: a processor, configured for time-hashing at least one user equipment (UE) to a particular subframe, the particular subframe defining a paging occasion for a paging group associated with the at least one UE; associating a paging group ID for the paging group with a physical downlink control channel (PDCCH); allocating, in the PDCCH, resources associated with a physical downlink shared channel (PDSCH); and transmitting, in the PDSCH, a paging message for the at least one UE during the paging occasion; and a memory coupled to the processor for storing data.

In another aspect of the disclosure, the apparatus above is provided, wherein the processor is further configured for transmitting on the PDCCH a paging indicator (PI) associated with the paging group associated with the at least one UE.

In another aspect of the disclosure, a method for transmitting paging messages in wireless communication system is provided, the method comprising: grouping user equipments (UEs) in paging groups according to different time instances with a particular DRX cycle; grouping paging messages associated a particular paging group associated with multiples UEs into a single physical downlink shared channel (PDSCH) transmission; and transmitting the single PDSCH during a corresponding time instance associated with a paging group, wherein the UEs of the particular paging group decodes the correct PDSCH based on a common paging group ID in a PDCCH transmitted to the UEs.

In another aspect of the disclosure, the method above is provided, wherein the PDCCH includes a paging indicator (PI) associated with a subset of the UEs having the common paging group ID.

In another aspect of the disclosure, a method above is provided, further comprising transmitting on a separate PDCCH the paging indicator (PI).

In another aspect of the disclosure, a method above is provided, wherein the PDCCH is the same as a conventional PDCCH with an exception of a terminating ID being replaced with a specialized paging group ID.

DETAILED DESCRIPTION

The features, nature, and advantages of the present disclosure will become more apparent from the detailed description set forth below when taken in conjunction with the drawings.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a known technique. SC-FDMA has similar performance and essentially the same overall complexity as those of OFDMA systems. A SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
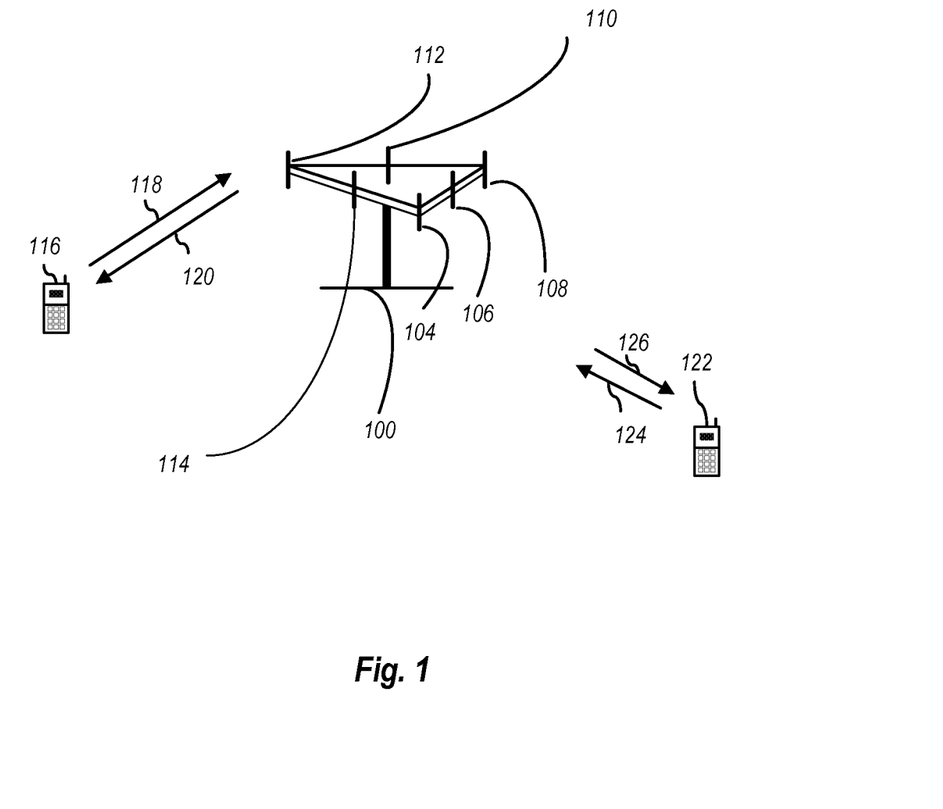
FIG. 1 depicts a multiple access wireless communication system according to one embodiment.

Referring to FIG. 1, a multiple access wireless communication system according to one embodiment is illustrated. An access point 100 (AP), also referred to as e-NodeB or e-NB, includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT), also referred to as user equipment (UE), is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
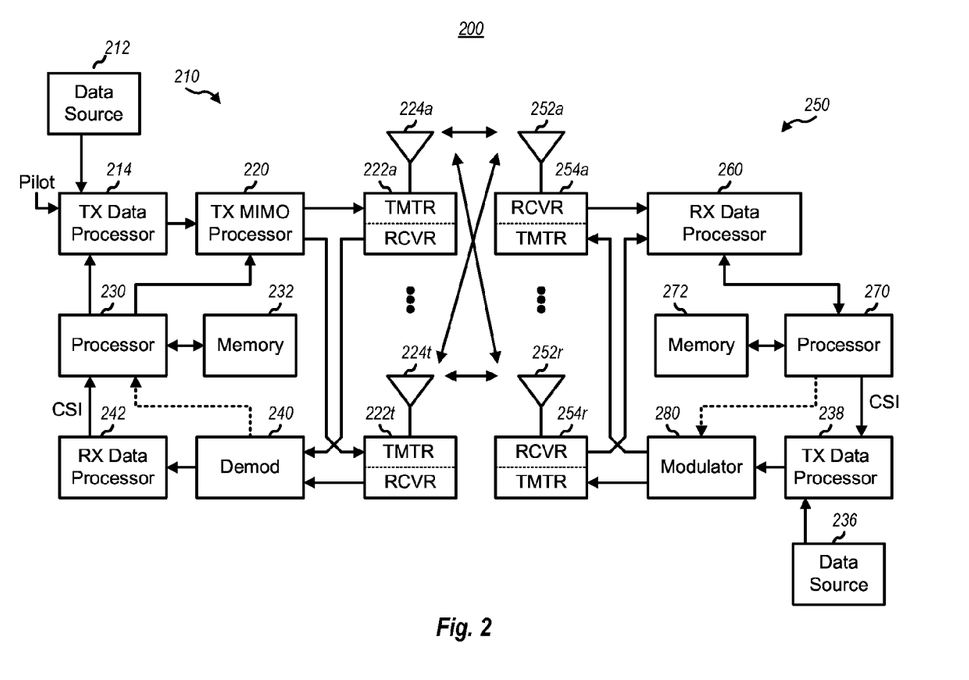
FIG. 2 is a block diagram of a communication system according to one embodiment.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

Figure 3:
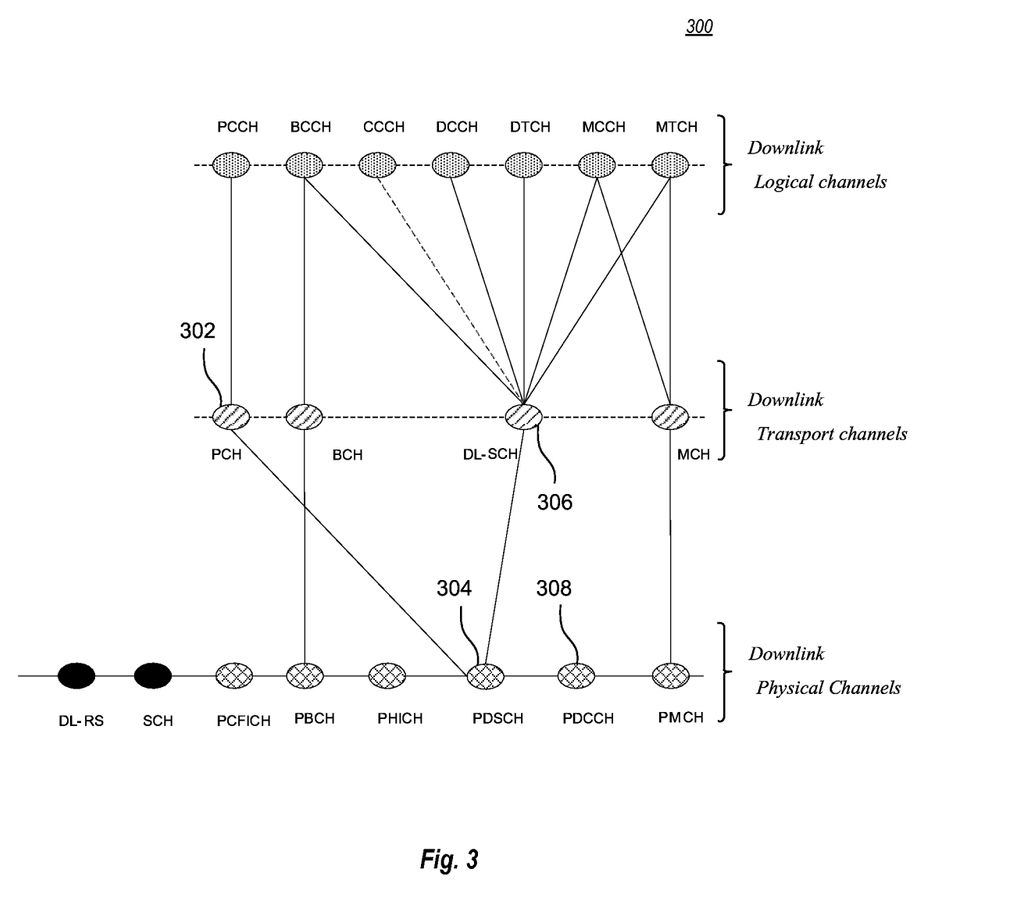
FIG. 3 depicts an exemplary channel mapping arrangement for downlink Logical, Transport, and Physical channels according to one embodiment.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multmedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel Referring to FIG. 3, there is shown a channel mapping arrangement for downlink Logical, Transport, and Physical channels. For example, E-UTRA employs the channel mapping arrangement shown in FIG. 3. As shown in FIG. 3, the paging transport channel (PCH) 302 is mapped to the physical downlink shared channel (PDSCH) 304. For example, PDSCH 304 may be incorporated in a transmission time interval (TTI) of one millisecond (1 ms).

Paging by a base station to a terminal, using LTE-based systems for example, is accomplished via the downlink PHY channels. This will consist of the PDCCH 308—control channel and the PDSCH 304—data channel. The PDCCH 308 operates as a preamble in the 1 ms TTI (subframe), and refers to the following PDSCH 304, which carries the actual paging message or data/information. The PDCCH 308 provides the location of the PDSCH 304 in the downlink stream and its format, modulation, coding and so forth to the receiving UE. Therefore, after decoding the PDCCH 308, the UE can determine where in the subframe the corresponding paging information is located, if the UE is identified as the recipient of the page.

With a view to the channel mapping arrangement of FIG. 3, in one of various exemplary embodiments, a paging group ID may be used on L1/L2 signaling channel to page a group of UEs having a common paging group ID. Many UEs can be defined in a paging group which provides a convenient scheme for alerting multiple UEs. Where the precise UE ID is provided on the downlink shared channel (DL-SCH) 306, multiple UEs can be sent on DL-SCH 306. A variation or modification of this approach is also possible, by use of a Paging Indicator (PI), as further discussed below. Thus, methods and systems are described that eliminate the need for individual UEs without the tagged assignments to decode the entirety of the PDCCH and/or PDSCH. For large paging groups and/or segments of paging groups, the benefits of such an approach will become readily evident. The use of paging groups IDs and Paging Indicators and their implementation are further detailed below.

Figure 4A:
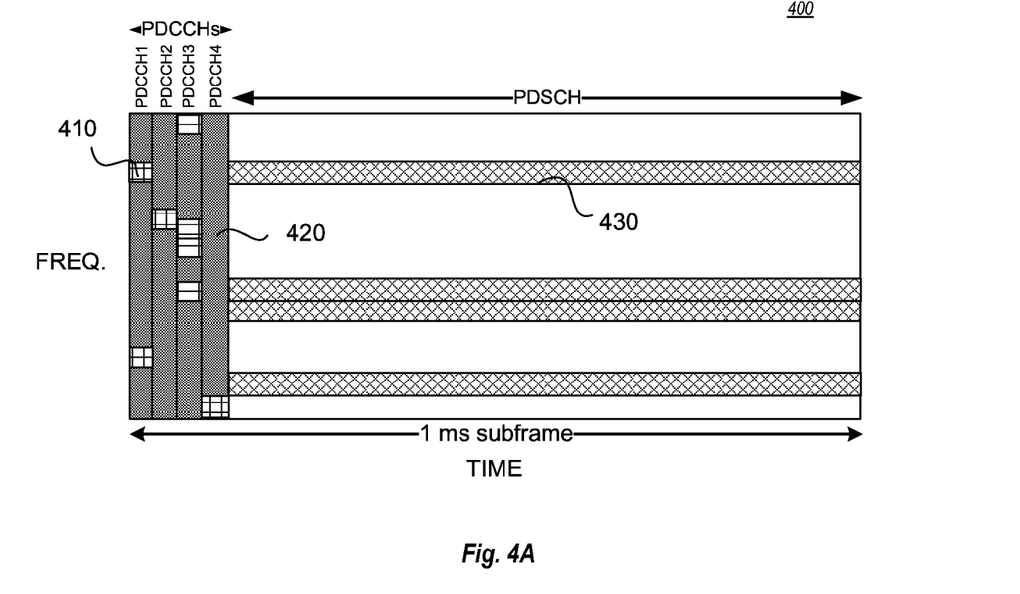
FIGS. 4A-B are illustrations of sample PDCCH and PDSCH arrangements in a downlink subframe.

FIG. 4A illustrates sample PDCCH and PDSCH arrangements in a downlink subframe. The PDCCH 410 is comprised of combinations of individual OFDM symbols/tones 420 in corresponding time slots 430 or strips. For purposes of illustrations, four possible PDCCHs—PDCCH1, PDCCH2, PDCCH3, and PDCCH4 are shown within respective time slots 430. Of course, depending on the implementation, more or less PDCCHs may be used.

Multiple symbols/tones 420 may be used for a given PDCCH 410. The symbols/tones 420 are generally referred to as Resource Elements (REs), thus several REs (420) may be used to represent a PDCCH 410, the various combinations of the REs (420) providing paging ID information and the corresponding PDSCH 440 location, etc. For example, PDCCH1 411 may refer to paging ID 1, which identifies a given UE group that is associated with paging ID 1, and also provides the UE group with the location of the PDSCH1 data found in the PDSCH 440 data streams. Thus, a UE must decode multiple PDCCHs 410 in the preamble of the subframe to determine if its group is identified by the ID found in the PDCCHs 410.

Figure 4B:
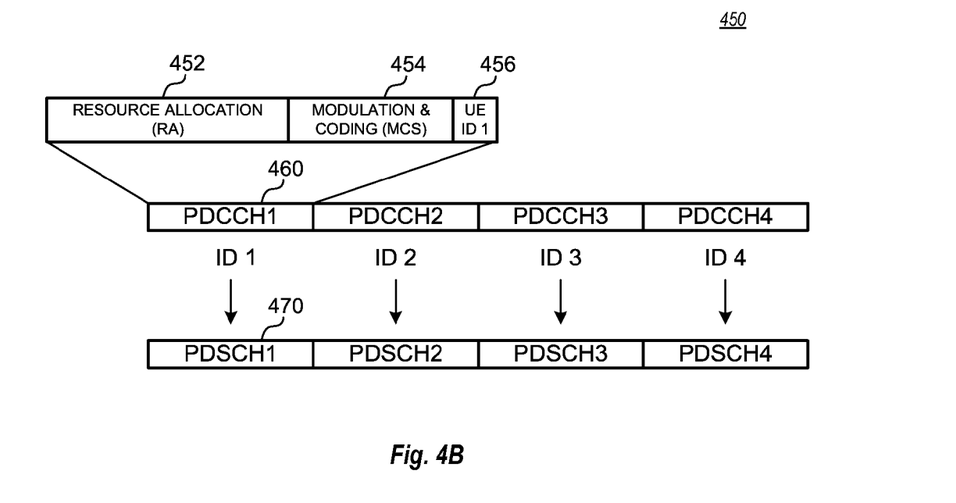

FIG. 4B is a block diagram 450 illustrating a mapping of the PDCCH information to PDSCHs. PDCCH1 460 is illustrated as being composed of the standard resource allocation (RA) block 452, modulation & coding (MCS) block 454, and the paged UE's ID tag/number 456. From the UE's ID tag/number 456 extracted from PDCCH1 460, the UE then can then find the appropriate PDSCH1 470 data stream to determine the paging information being sent. As is apparent in FIG. 4B, the different PDCCHs map to different PDSCHs, based on the resolved ID tag/number. As stated above, the UE must decode multiple PDCCHs to determine if its group ID is being paged. Of course, this approach is a brute force approach and therefore, a more elegant set of approaches using paging group IDs and paging indicators (PIs) are described below.

Figure 5:
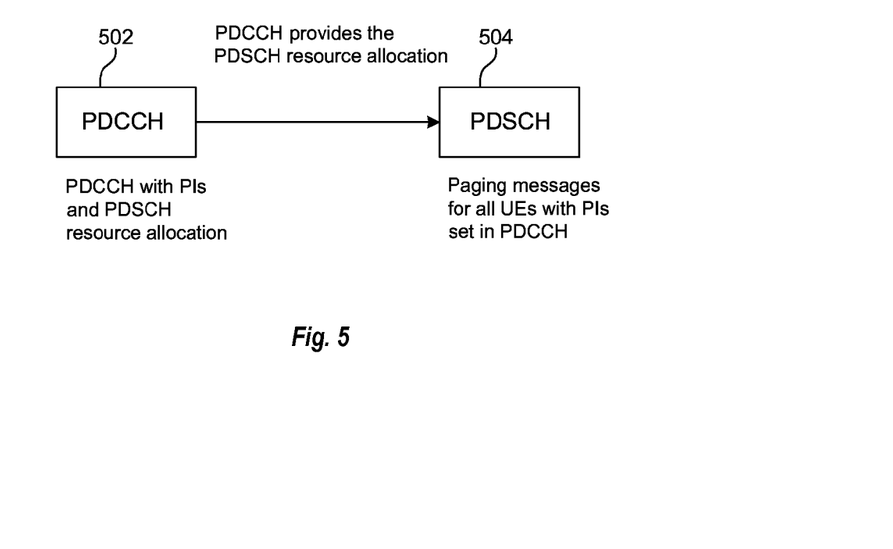
FIG. 5 is a flow diagram depicting an exemplary control arrangement to support transmission of paging messages according to one embodiment.

FIG. 5 provides a block diagram 500 depicting an exemplary control arrangement to support transmission of paging messages utilizing Paging Indicators (PIs). In FIG. 5, the physical downlink control channel (PDCCH) 502 provides the PDSCH 504 resource allocation to support paging messages. According to one aspect, the format of PDCCH 502 includes: Paging Indicators (PIs), resource allocation for the accompanying PDSCH, and other fields. Each PI can be associated with one or several UEs in the Paging group associated with this PDCCH transmission, for example, identified by the time-hashing and masking of the CRC. According to one aspect, all other fields in PDCCH 502 format with regular DL assignments are either set to fixed values or do not apply (N/A) for the transmission of Paging messages over PDSCH. For example, the Transport format may be fixed as set in the appropriate Specifications; the Hopping flag may be fixed as set in the appropriate Specifications or 1-bit in PDCCH; HARQ process ID may be N/A; TrBlk ID may be N/A; Retransmission Sequence Number may be N/A; TPC command may be N/A; Precoding matrix may be N/A. The CRC of PDCCH 502 may be masked with the Paging group ID. And so forth. As indicated in FIG. 5, PDSCH 504 carries the Paging message for all the UEs indicated by the PIs in PDCCH 502. Based on the above description, various modifications to the format of the PDCCHs can be obtained to further increase the efficiency of paging notification to UEs.

Figure 6:
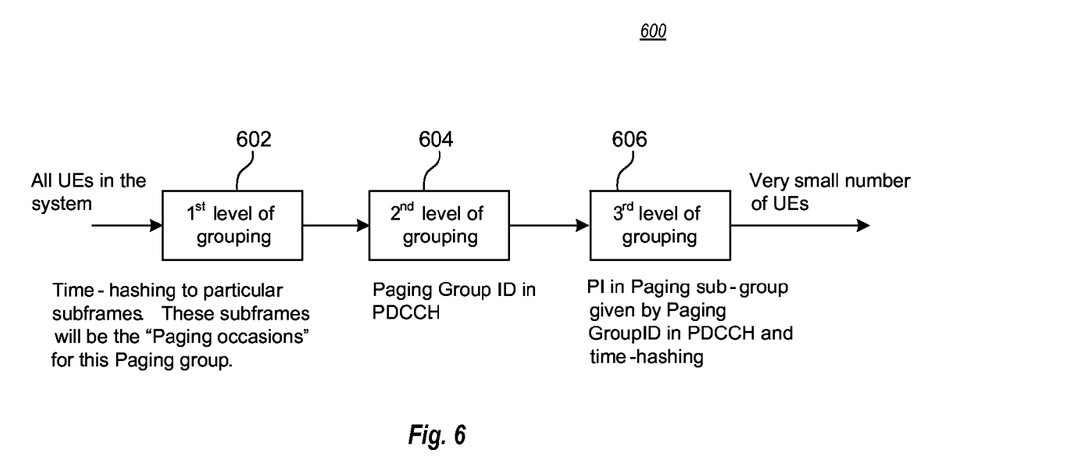
FIG. 6 is a flow diagram depicting an exemplary paging group nesting arrangement according to one embodiment.

FIG. 6 illustrates a flow diagram depicting an exemplary paging group nesting arrangement according to one embodiment. FIG. 6 depicts three-levels of UE grouping. The first level grouping 602 involves time-hashing to particular subframes. These subframes correspond to the "paging occasions" for this paging group. That is, based on the time-hashing arrangement, groups of UEs may be configured to only "look" at particular subframes. The second level grouping 604 involves providing the Paging Group ID in the PDCCH preceding the page messages—PDSCH. The third level grouping 606 involves providing the paging indicator (PI) in paging subgroups in the PDCCH (e.g., via the Paging GroupID). As a result of this nesting arrangement, not all the UEs hashed to the same subframe and to the same Page Group ID will require decoding the associated PDSCH. The benefits of this arrangement will be evident below.

According to the arrangements described above in conjunction with FIGS. 5 and 6, a single PDCCH is associated to the paging transmission. Since resources for the paging messages on PDSCH can be dynamically allocated, scheduler flexibility is provided and the capability to multiplex variable number of paging messages (e.g., for multiple UEs) is provided. In sum, the above described PDCCH format includes binary (single-bit) or multi-bit paging indicators (PI), and resource allocations for associated PDSCH to enable the efficient support of paging for entire paging groups and/or subsets of paging groups. The transport format of the PDSCH carrying the Page messages for the multiple UEs whose PIs are set in the PDCCH may be fixed and, therefore, can be defined in the appropriate specifications.

According to various aspects, UEs are grouped in "paging groups" according to different time instances (or "paging occasions") with a particular DRX cycle. According to another aspect, paging messages for multiple UEs can be grouped into the same PDSCH. For example, the UE ID may be given as part of the Page message for that UE in the PDSCH transmission.

As an example of the above-defined approach, the first PDCCH can be modified to only contain the list of paging indicators (PI) that operates as a pointer to the corresponding PDCCH in the subframe slots. For example, PDCCH1 (being the "first" PDCCH in the chain of PDCCHs) can contain the list of paging indicators (PI1, PI2, PI3, etc.) that point to the appropriate PDCCH for a given paging indicator. The paging indicators (PI) can be used to identify a subset of Paging Groups (drilling down to an individual UE, if desired). By use of PIs, a UE decoding the PDCCH and finding itself identified by the PI can be directed to the appropriate PDCCH in the preamble, while UEs not being identified by the PI will not need to proceed further (even if tagged with the Paging Group, if present). As is apparent with pointer type evaluators, other uses for the PIs may be devised without departing from the spirit and scope of this disclosure.

Figure 7A:
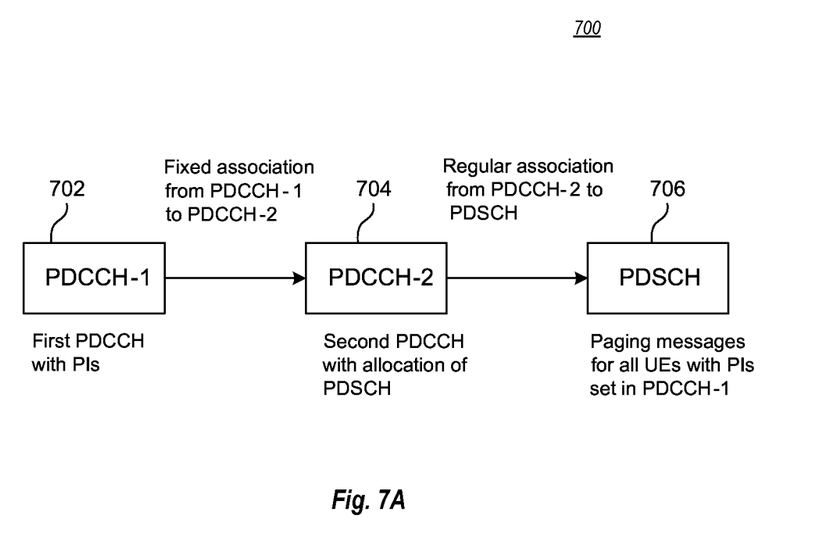
FIGS. 7A-B is a flow diagram depicting an exemplary control arrangement and sample PDCCH, respectively, in a downlink subframe to support transmission of paging messages according to one embodiment.
Figure 7B:
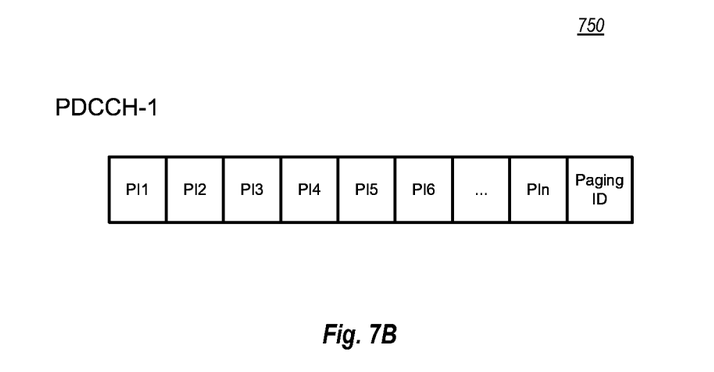

FIGS. 7A-B illustrate a flow diagram 700 depicting the exemplary control arrangement to support transmission of paging messages and a sample format 750, respectively, as described above. In FIG. 7A, a first PDCCH (PDCCH-1) 702 along with a second PDCCH (PDCCH-2) 704 is provided to provide control for paging messages. PDCCH-1 702 is formatted to carry only binary paging indicators (PIs). Each PI can be associated with one or several UEs in the Paging group associated with this PDCCH transmission, for example, identified by the time-hashing and masking of the CRC. Additionally, PDCCH-1 702 can be CRC masked with the Paging group ID, as shown in FIG. 7B.

A fixed association from PDCCH-1 702 to PDCCH-2 can be provided. Thus, from the reception of PDCCH-1 702, the UEs associated whose PIs are set can ascertain where to find PDCCH-2 704. For example, the time-frequency location of PDCCH-2 704 can be either in the same subframe as PDCCH-1 702 or in a different one.

Also, PDCCH-2 704 can be formatting as a "regular" PDCCH (that is, a PDCCH as already specified in the appropriate Specifications) with DL assignments for single codeword transmission. Thus, PDCCH-2 704 will include such information as resource allocation of PDSCH 706, transport format indication, hopping flag, and other data. Additionally, PDCCH-2 704 can be CRC masked with the Paging group ID in a manner similar to that for PDCCH-1 702. The association from PDCCH-2 704 to PDSCH 706 can be provided according to the association already specified in the appropriate Specifications. With this arrangement, PDSCH 706 carries the paging messages for all UEs indicated by the PIs in the PDCCH-1 702, and PDSCH 706 is transmitted according to the resources allocated in the format indicated by PDCCH-2 704. The control arrangement of FIGS. 7A-B provide multiple levels of UE grouping as described in conjunction with FIG. 6 above.

Figure 8A:
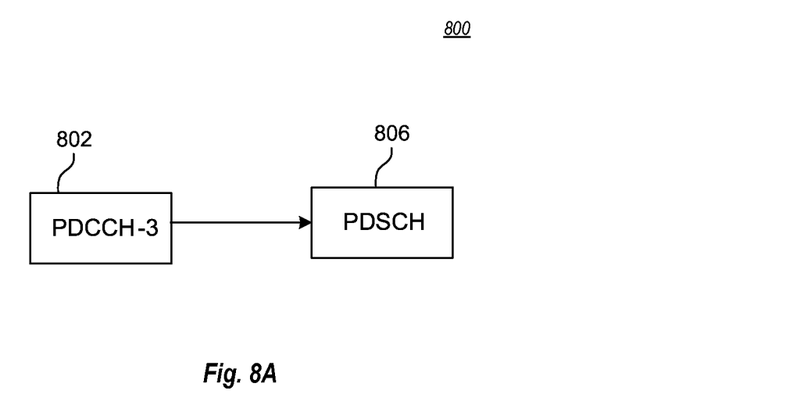
FIGS. 8A-B is a flow diagram depicting another exemplary control arrangement and sample PDCCH, respectively, to support transmission of paging messages according to one embodiment.
Figure 8B:
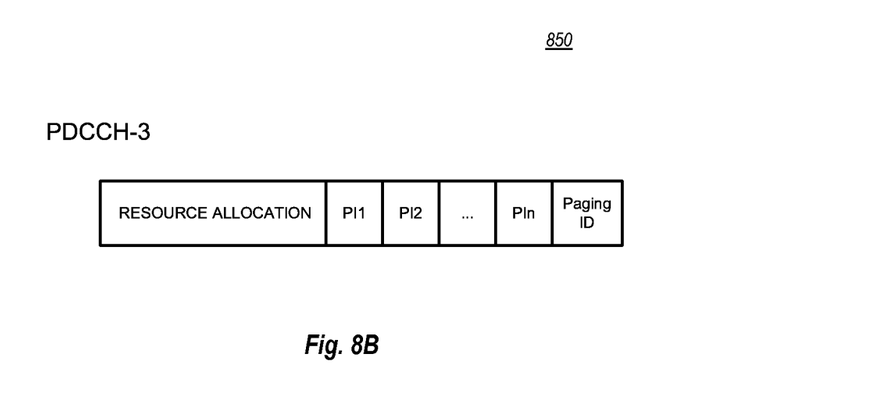

Referring now to FIGS. 8A-B, there is shown a flow diagram 800 depicting another exemplary control arrangement and sample format 850, respectively, to support efficient transmission of paging messages. In this embodiment, PDCCH-3 802 is configured with the resource allocation(s), Paging indicators (PIs) and Paging group ID for the UEs as illustrated in FIG. 8B. The PDCCH-3 802 can be considered a "hybrid" PDCCH, combining some of the features of a standard PDCCH with the feature(s) of the PDCCH-1 702 embodiment of FIGS. 7A-B. This hybrid approach benefits from not requiring the use of an additional PDCCH. This exemplary method provides sufficient information to the related PDSCH 806 for finding the associated PDSCH 806 while reducing the number of PDCCH decodes for the UE, by use of the PIs. Thus, the best of both worlds, so to speak, is envisioned in the embodiment described by FIGS. 8A-B.

It should be noted that the nomenclature of appending a number (e.g., 1, 2, or 3) at the end of the PDCCH descriptor (e.g., PDCCH-1, PDCCH-2, PDCCH-3) in this disclosure is simply used to differentiate PDCCHs in the context of their discussion. That is, PDCCH-3 of FIGS. 8A-B is different from the PDCCH-1 or PPDCH-2 of the previous figures. While, PDCCH-2 of FIGS. 9A-B (discussed below) is different from the PDCCH-2 of FIGS. 7A-B, as evidenced by their accompanying description.

Figure 9A:
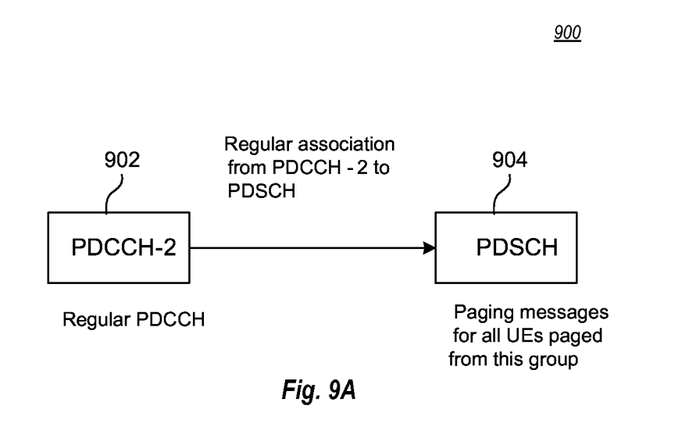
FIGS. 9A-B is a flow diagram depicting another exemplary control arrangement and sample PDCCH, respectively, to support transmission of paging messages according to one embodiment.
Figure 9B:
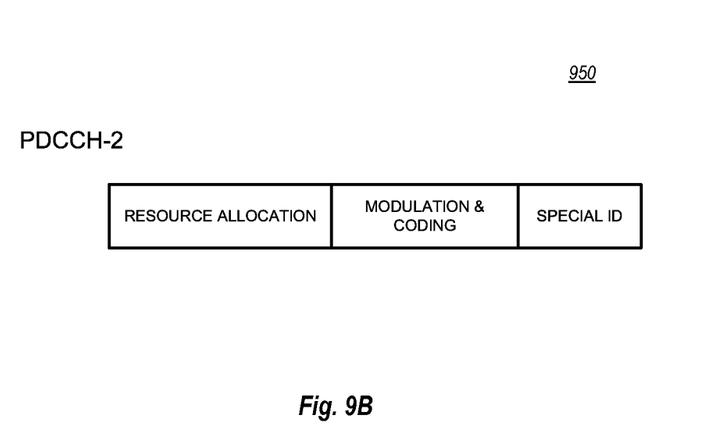

Referring next to FIGS. 9A-B, there is shown a flow diagram 900 depicting another exemplary control arrangement and sample format 950, respectively, to support efficient transmission of paging messages. The control arrangement depicted by FIG. 9A, provides PDCCH-2 902, which is a PDCCH as specified in the appropriate Specifications, with DL assignment for single codeword transmission. Thus, PDCCH-2 902 will include such information as resource allocation of PDSCH 904, transport format indication, hopping flag, and other data. Additionally, PDCCH-2 902 is CRC masked with the Paging group ID. The above arrangements are demonstrated in FIG. 9B. The association from PDCCH-2 902 to PDSCH 904 can be provided according to the association already specified in the appropriate Specifications.

Continuing with FIGS. 9A-B, PDSCH 904 carries the Paging message for all the UEs that in the Paging group ID associated with PDCCH-2 902. PDSCH 904 is transmitted according to the resources allocated and the format indicated by PDCCH-2 902. In this particular arrangement, two levels of UE grouping are provided corresponding with blocks 602 and 604 of FIG. 6. However in the arrangement of FIGS. 9A-B, the PI is not provided in the PDCCH (in contrast to block 606 of FIG. 6). Thus, all the UEs in the Paging group will need to demodulate the PDSCH 904 to see whether or not they are paged in the subframe.

Based on the above examples, multiple schemes for modifying the PDCCH have been demonstrated that provide improvements over conventional paging transmission, specifically with respect to decoding PDCCHs in the subframe preamble and to associating UEs with paging groups and subsets therein.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for transmitting paging messages in a wireless communication system, the method comprising:
    time-hashing a plurality of user equipment (UEs) to a particular frame based at least in part on a particular discontinuous reception (DRX) cycle;
    time-hashing a group of UEs of the plurality of UEs to a paging occasion within the particular frame;
    allocating, in a physical downlink control channel (PDCCH) during the paging occasion, resources associated with a physical downlink shared channel (PDSCH), wherein the PDCCH comprises a first PDCCH format and a second PDCCH format, the first PDCCH format comprising at least one paging indicator, wherein each paging indicator is associated with one or more UEs of the group of UEs, and wherein each paging indicator comprises a pointer to the second PDCCH format, the second PDCCH format comprising an indication of the allocated resources; and
    transmitting, in the PDSCH, a paging message for at least one UE of the group of UEs on the allocated resources.

2. The method of claim 1, wherein the paging occasion comprises a particular subframe within the particular frame.

3. The method of claim 2, wherein at least a portion of the particular subframe is cyclic redundancy checked (CRC) masked with a paging identifier associated with the one or more UEs of the group of UEs.

4. The method of claim 1, wherein the at least one paging indicator comprises a first paging indicator, and wherein the paging message is associated with the first paging indicator.

5. The method of claim 1, wherein the first PDCCH format comprises only the at least one paging indicator.

6. An apparatus operable in a wireless communication system, the apparatus comprising:
    a processor;
    memory in electronic communication with the processor; and
    instructions stored in the memory, the instructions being executable by the processor to:
        time-hash a plurality of user equipment (UEs) to a particular frame based at least in part on a particular discontinuous reception (DRX) cycle;
        time-hash a group of UEs of the plurality of UEs to a paging occasion within the particular frame;
        allocate, in a physical downlink control channel (PDCCH) during the paging occasion, resources associated with a physical downlink shared channel (PDSCH), wherein the PDCCH comprises a first PDCCH format and a second PDCCH format, the first PDCCH format comprising at least one paging indicator, wherein each paging indicator is associated with one or more UEs of the group of UEs, and wherein each paging indicator comprises a pointer to the second PDCCH format, the second PDCCH format comprising an indication of the allocated resources; and
        transmit, in the PDSCH, a paging message for at least one UE of the group of UEs on the allocated resources.

7. A computer program product for transmitting paging messages in a wireless communication system, the computer program product comprising a non-transitory computer-readable medium storing instructions executable by a processor to:
    time-hash a plurality of user equipment (UEs) to a particular frame based at least in part on a particular discontinuous reception (DRX) cycle;
    time-hash a group of UEs of the plurality of UEs to a paging occasion within the particular frame;
    allocate, in a physical downlink control channel (PDCCH) during the paging occasion, resources associated with a physical downlink shared channel (PDSCH), wherein the PDCCH comprises a first PDCCH format and a second PDCCH format, the first PDCCH format comprising at least one paging indicator, wherein each paging indicator is associated with one or more UEs of the group of UEs, and wherein each paging indicator comprises a pointer to the second PDCCH format, the second PDCCH format comprising an indication of the allocated resources; and
    transmit, in the PDSCH, a paging message for at least one UE of the group of UEs on the allocated resources.

8. A method for receiving paging messages in a wireless communication system, the method comprising:
    determining, at a user equipment (UE), a particular frame based at least in part on a discontinuous reception (DRX) cycle associated with a plurality of UEs;
    determining, at the UE, a paging occasion within the particular frame, wherein the paging occasion is associated with a group of UEs of the plurality of UEs;
    scanning, during the paging occasion, a physical downlink control channel (PDCCH) for an allocation of resources associated with a physical downlink shared channel (PDSCH), wherein the PDCCH comprises a first PDCCH format and a second PDCCH format, the first PDCCH format comprising at least one paging indicator, wherein each paging indicator is associated with one or more UEs of the group of UEs, and wherein each paging indicator comprises a pointer to the second PDCCH format, the second PDCCH format comprising an indication of the allocated resources; and
    receiving, in the PDSCH, a paging message for the UE on the allocated resources.

9. The method of claim 8, wherein the paging occasion comprises a particular subframe within the particular frame.

10. The method of claim 9, wherein at least a portion of the particular subframe is cyclic redundancy checked (CRC) masked with a paging identifier associated with the one or more UEs of the group of UEs.

11. The method of claim 8, wherein the at least one paging indicator comprises a first paging indicator, wherein the UE is associated with the first paging indicator, and wherein the paging message is associated with the first paging indicator.

12. The method of claim 8, wherein the first PDCCH format comprises only the at least one paging indicator.

13. An apparatus operable in a wireless communication system, the apparatus comprising:
- a processor;
- memory in electronic communication with the processor; and
- instructions stored in the memory, the instructions being executable by the processor to:
  - determine, at a user equipment (UE), a particular frame based at least in part on a discontinuous reception (DRX) cycle associated with a plurality of UEs;
  - determine, at the UE, a paging occasion within the particular frame, the paging occasion associated with a group of UEs of the plurality of UEs;
  - scan, during the paging occasion, a physical downlink control channel (PDCCH) for an allocation of resources associated with a physical downlink shared channel (PDSCH), wherein the PDCCH comprises a first PDCCH format and a second PDCCH format, the first PDCCH format comprising at least one paging indicator, wherein each paging indicator is associated with one or more UEs of the group of UEs, and wherein each paging indicator comprises a pointer to the second PDCCH format, the second PDCCH format comprising an indication of the allocated resources; and
  - receive, in the PDSCH, a paging message for the UE on the allocated resources.

14. A computer program product for receiving paging messages in a wireless communication system, the computer program product comprising a non-transitory computer-readable medium storing instructions executable by a processor to:
- determine, at a user equipment (UE), a particular frame based at least in part on a discontinuous reception (DRX) cycle associated with a plurality of UEs;
- determine, at the UE, a paging occasion within the particular frame, the paging occasion associated with a group of UEs of the plurality of UEs;
- scan, during the paging occasion, a physical downlink control channel (PDCCH) for an allocation of resources associated with a physical downlink shared channel (PDSCH), wherein the PDCCH comprises a first PDCCH format and a second PDCCH format, the first PDCCH format comprising at least one paging indicator, wherein each paging indicator is associated with one or more UEs of the group of UEs, and wherein each paging indicator comprises a pointer to the second PDCCH format, the second PDCCH format comprising an indication of the allocated resources; and
- receive, in the PDSCH, a paging message for the UE on the allocated resources.

\* \* \* \* \*